June 4, 1968  R. S. LINSTEAD  3,386,430
PORTABLE FOLDABLE OUTDOOR GRILL
Filed March 29, 1966  2 Sheets-Sheet 2

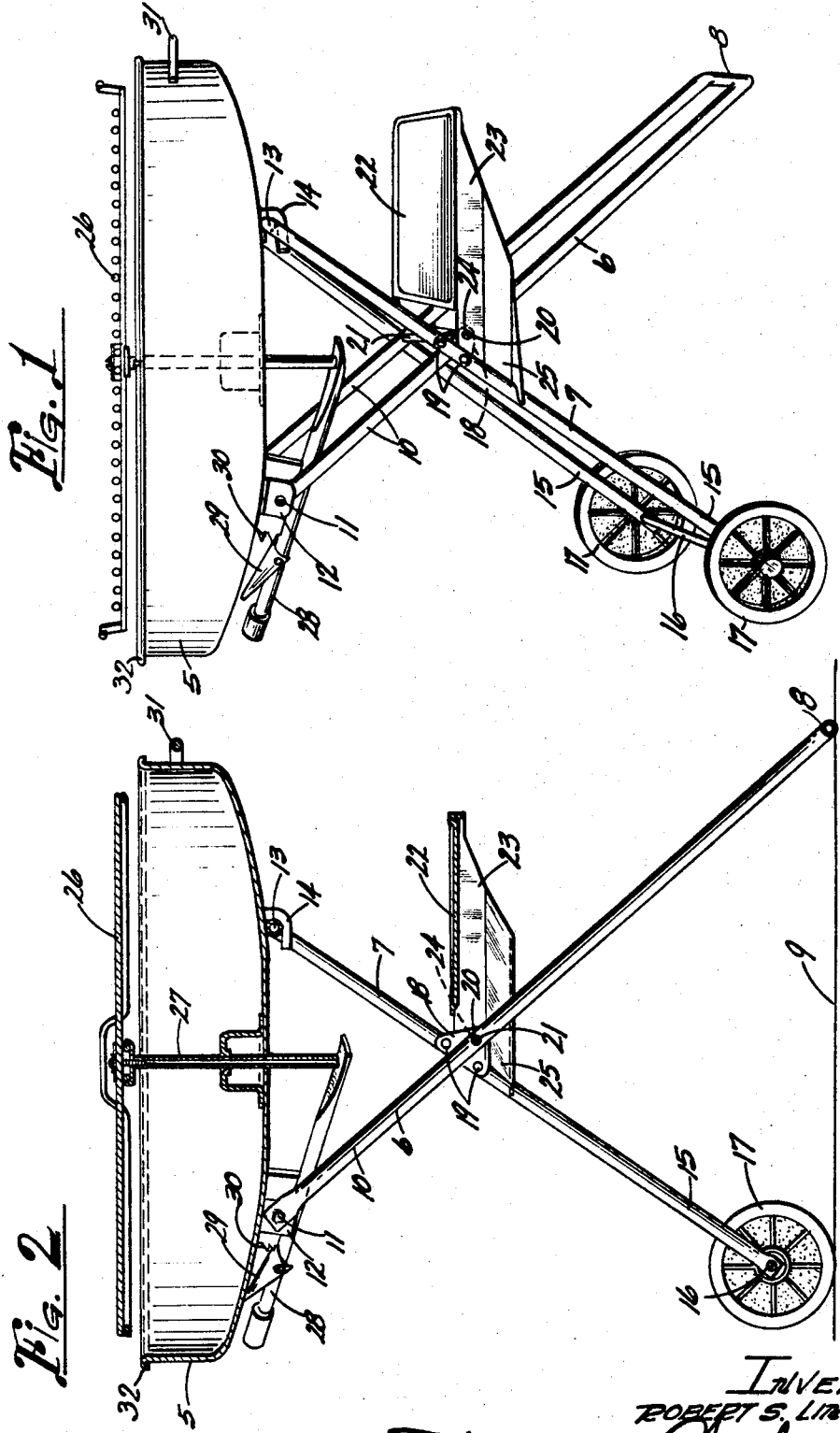

INVENTOR
ROBERT S. LINSTEAD
ATTORNEY

United States Patent Office 3,386,430
Patented June 4, 1968

3,386,430
PORTABLE FOLDABLE OUTDOOR GRILL
Robert S. Linstead, Rockford, Ill., assignor to Structo Division King-Seeley Thermos Co., Freeport, Ill., a corporation of Michigan
Filed Mar. 29, 1966, Ser. No. 538,405
9 Claims. (Cl. 126—25)

This invention relates to a portable foldable outdoor grill, and has for its principal object the provision of such a grill, which, when folded, is much more easily portable than any previous designs with which I am familiar, and is also much more compact, thereby taking up much less space in a garage, basement, or on a patio where storage space for such an item is usually rather limited, a further important feature being the ease with which the device can be folded after use, and unfolded again when it is to be set up for use, the positive locking action obtainable with the present unique design making certain that the grill when set up cannot possibly collapse and, when folded, is equally well locked up.

Among the features of the present invention that are considered of special importance are:

(1) Double use of a hook on the bottom of the brazier to engage the cross-portion on the upper end of one of the U-shaped legs of the X-frame for good support of the brazier in set-up position and to snap over a flexible cross rod intermediate the ends of the other U-shaped leg of the X-frame to lock the brazier and folded legs in folded position;

(2) Triple use of the cross-portion of one of the U-shaped legs of the X-frame (a) as a foot for support of the grill in set-up position, or (b) as a handle in rolling the unit in folded condition to and from the place of use, or (c) as a cross-member in hanging up the unit in folded condition on a hook on a wall, and (3) A foldable shelf for condiments and utensils utilizes the same cross-rod on one of the supporting legs previously mentioned as a pivotal support on opposite sides of one of the legs of the X-frame and has forwardly reaching side extensions, which, in the unfolded position of the legs, bear against the other leg of the X-frame below the pivotal axis for good support, this arrangement enabling the foldable shelf to fold compactly between the legs in the folding up of the grill and yet the shelf drops automatically by gravity into operative position in the unfolding of the grill and is then handily located below the working top of the grill so that a fork placed on the shelf is ready for instant use when needed in turning over meat or to pick it up, and condiments on the shelf are just as handily located for use in seasoning the meat being prepared.

The invention is illustrated in the accompanying drawings, in which—

FIG. 1 is a combination side view and perspective of the foldable portable grill of my inventon;

FIG. 2 is a vertical cross-section through said grill, and

The same reference numerals are applied to corresponding parts throughout the views.

Figure 3:
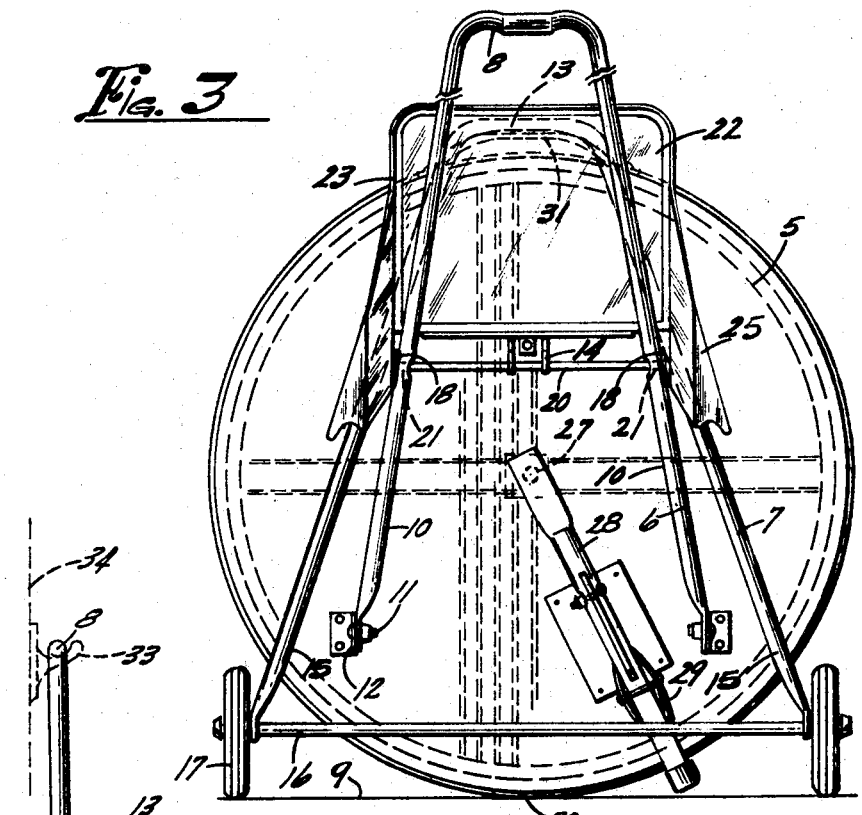
FIGS. 3 and 4 are a rear view and a side view, respectively, of the grill in folded condition.

Referring to the drawings, the foldable portable grill of my invention comprises a brazier 5 adapted to contain a bed of burning charcoal when supported in a horizontal position as shown in FIGS. 1 and 2 on the X-frame 6–7. The longer leg 6 of this frame is generally U-shaped with its lower cross-portion 8 adapted to rest on the ground 9 while the upper ends of the arms 10, which are flattened in parallel planes, are pivoted as at 11 to brackets 12 fastened to the bottom of the brazier 5. The other leg 7 of the X-frame is also generally U-shaped with its cross-portion 13 disposed uppermost and engaged in a hook 14 provided on and extending downwardly from the bottom of the brazier 5, while the flattened lower ends of the arms 15 of this leg carry a horizontal axle 16 with wheels 17 mounted on the opposite ends thereof. Small triangular brackets 18 riveted to the opposite side portions of leg 7 intermediate the ends thereof, as indicated at 19, carry a somewhat flexible and resilient cross-rod 20, which, at its opposite ends, extends through bearing holes 21 provided therefor in the opposite side portions of leg 6 to pivotally connect the legs 6 and 7 and permit folding and unfolding of the grill.

A sheet metal shelf 22 disposed horizontally in a predetermined spaced relation below and parallel to the brazier 5 so as to be handy for support of salt and pepper shakers, for example, and utensils, such as a fork or tongs, has opposed parallel side flanges 23 projecting downwardly therefrom which are pivoted, as shown at 24, on the opposite ends of the cross-rod 20 alongside the brackets 18, this shelf in the folding of the grill being arranged to fold in between the legs 6 and 7 in the manner shown in FIG. 4. However, in the unfolded position of the legs, the laterally and forwardly reaching hook-shaped extensions 25 on the flanges 23 serve by abutment with the back of the leg 7 on both side portions below the rod 20 and pivots 24 to support the shelf 22 rigidly in the horizontal operative position.

The brazier 5 is shown as equipped with the usual wire grill 26 on the top thereof supported on a central vertical shaft 27 for vertical adjustment by means of a manually adjustable pivoted rocker arm 28 in the usual way, a latch 29 pivoted on the rocker arm 28 near its handle end and cooperating with a ratchet 30 serving to lock the rocker arm releasably in adjusted position to maintain a given elevation of the grill 26 with respect to the bed of burning charcoal. A handle 31 is provided on one side of the brazier to enable moving the grill easily when set up for use and also to facilittae folding and unfolding of the grill.

Figure 4:
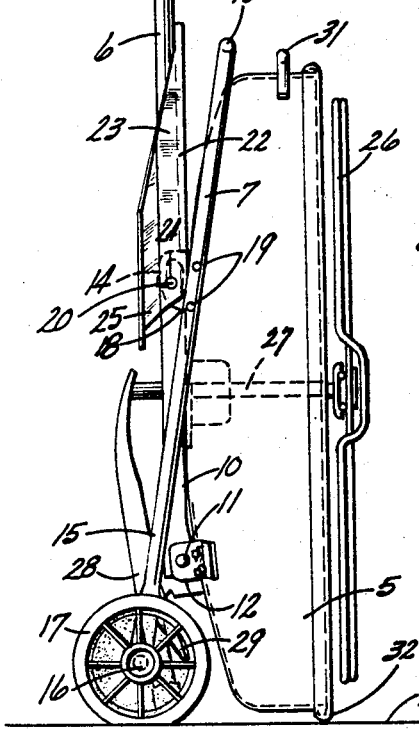

In operation, the hook 14 is designed to snap over the flexible resilient cross-rod 20 in moving to or from the folded position shown in FIGS. 3 and 4, the operator using the handles 8 and 31 to spread the brazier 5 and leg 6 apart in unfolding the grill, and to move these parts together in the folding operation. When the grill is folded, the two wheels 17 and the lowermost part of the rim 32 of the brazier provide three-point support for the grill to stand on the floor or ground indicated at 9. The cross-portion 8 of the leg 6 serves as a foot for support of the grill in the set-up position, as seen in FIG. 2, or as a handle in rolling the unit in folded condition to and from the place of use, as seen in FIGS. 3 and 4. It can also be used as a cross-member in hanging up the unit on a hook, as indicated in dotted lines at 33 in FIG. 4, where the wall on which the hook is provided is also indicated in dotted lines at 34. The shelf 22 for condiments and utensils folds neatly between the legs 6 and 7 when the unit is folded, as seen in FIG. 4, but when the unit is unfolded, as shown in FIGS. 1 and 2, the shelf drops by gravity to its operative position, pivoting about the cross-rod 20 as an axis, the forwardly reaching hook-shaped side extensions 25 bearing against the back of the leg 7 on both side portions thereof below the pivotal axis for good rigid support of the shelf in its unfolded position. In this position, the shelf is nicely spaced below the working top of the grill so that a fork or tongs resting on the shelf will be ready for instant use when needed in turning over meat or to pick it up, and condiments are just as handily located for use in seasoning the meat being prepared.

It is believed the foregoing description conveys a good understanding of the objects and advantages of my invention. The appended claims have been drawn to cover all legitimate modifications and adaptations.

I claim:
1. A foldable portable grill comprising a brazier, and a foldable X-frame for support thereof in its horizontal operative position, said X-frame comprising two generally U-shaped legs, the first of which has the upper ends of the arms thereof pivotally connected to the brazier on one side of its center while the substantially horizontal cross-portion of the U at the lower end of this leg rests on the ground or floor, the second leg being of inverted U-form pivotally connected intermediate the ends of the arms thereof to the respective arms of the first leg intermediate the ends thereof, the lower ends of the arms of the second leg carrying rollers to rest on the ground or floor, while the substantially horizontal cross-portion of this U at the upper end is detachably engaged in a substantially vertical hook provided on the brazier on the other side of its center and facing the pivotal connections of the first leg with the brazier, the X-frame upon disconnection of said hook from the cross-portion of said second leg being foldable to substantially flat form into compact substantially parallel relation to said brazier so that the first named cross-portion serves as a handle for rolling the folded grill while the hook is detachably engaged over a substantially horizontal projection provided on one of said legs.

2. A foldable grill as set forth in claim 1 wherein a substantially horizontal cross-rod extending through registering bearings provided on the arms of said two generally U-shaped legs forms the pivotal connection between said legs besides providing the substantially horizontal projection provided on one of said legs for detachable engagement with said hook in the folded condition of said grill.

3. A foldable grill as set forth in claim 1 wherein a substantially horizontal cross-rod extending through registering bearings provided on the arms of said two generally U-shaped legs forms the pivotal connection between said legs besides providing the substantially horizontal projection provided on one of said legs for detachable engagement with said hook in the folded condition of said grill, said rod being flexible and resilient and engaging the hook at a point intermediate the ends of said rod, and said hook having a cam surface on its outer edge for deflection of said rod preparatory to its snapping onto the hook.

4. A foldable grill as set forth in claim 1 wherein a substantially horizontal cross-rod extending through registering bearings provided on the arms of said two generally U-shaped legs forms the pivotal connection between said legs besides providing the substantially horizontal projection provided on one of said legs for detachable engagement with said hook in the folded condition of said grill, said grill including a shelf below said brazier pivoted on said cross-rod and foldable relative to said legs from a substantially horizontal operative position to an inoperative position closely adjacent and substantially parallel to one of said legs.

5. A foldable grill as set forth in claim 1 wherein a substantially horizontal cross-rod extending through registering bearings provided on the arms of said two generally U-shaped legs forms the pivotal connection between said legs besides providing the substantially horizontal projection provided on one of said legs for detachable engagement with said hook in the folded condition of said grill, said grill including a shelf below said brazier pivoted on said cross-rod and foldable relative to said legs from a substantially horizontal operative position to an inoperative position closely adjacent and substantially parallel to one of said legs, said shelf having portions on opposite sides thereof at the pivoted end bearing on one of said legs in radially spaced relation to said rod to support said shelf rigidly in horizontal operative position against swinging downwardly about said rod as an axis.

6. A foldable portable grill comprising a brazier, and a foldable X-frame for support thereof in its horizontal operative position, one leg of the X-frame being pivotally connected at its upper end of said brazier on one side of the center thereof, the other leg of the X-frame in unfolded position being detachably connected at its upper end with said brazier on the opposite side of the center thereof, said X-frame when folded being disposed in compact relationship to the bottom of said brazier and being detachably connectable thereto in folded condition, the leg that is detachably connectable at its upper end to the brazier having wheels mounted on the lower end thereof for rolling support of said grill in folded or unfolded condition, the other leg that is pivotally connected at its upper end to said brazier having its other end extending upwardly beyond the top of said brazier in the vertical folded position thereof to serve as a handle to facilitate rolling of the folded grill from place to place.

7. A foldable grill as set forth in claim 6 wherein there is a handle provided on one of said brazier and X-frame which is in remote relationship to said wheels in the folded condition of said X-frame, whereby to facilitate rolling of the folded grill from place to place.

8. A foldable grill as set forth in claim 6 wherein a substantially horizontal cross-rod forms a part of the foldable X-frame, the same means for detachably connecting the upper end of one leg of said X-frame to said brazier in the unfolded position of said X-frame serving by detachable connection with said cross-rod to detachably connect said X-frame in folded condition to said brazier.

9. A foldable grill as set forth in claim 6 wherein one leg of the X-frame in the folded condition of said frame provides two of a three-point support for said folded grill with the brazier disposed in a vertical plane providing the third point at its lowermost portion.

References Cited

UNITED STATES PATENTS

| | | | |
|---|---|---|---|
| 2,484,239 | 10/1949 | Moon et al. | 126—9 X |
| 2,787,996 | 4/1957 | Rumsey | 126—25 |
| 2,994,315 | 8/1961 | Bussing | 126—25 X |
| 3,008,463 | 11/1961 | Frank | 126—9 |
| 3,147,748 | 9/1964 | Frank | 126—9 |
| 3,200,806 | 8/1965 | Goldstein | 126—25 |
| 3,297,016 | 1/1967 | Rhodes | 126—25 |

FREDERICK KETTERER, *Primary Examiner.*